(12) United States Patent
Kummerer

(10) Patent No.: US 11,680,188 B2
(45) Date of Patent: Jun. 20, 2023

(54) GLIDE AGENT

(71) Applicant: GIGAGLIDE Surface Technologies GmbH, Lambach (AT)

(72) Inventor: Robert Kummerer, Hallein (AT)

(73) Assignee: GIGAGLIDE SURFACE TECHNOLOGIES GMBH, Lambach (AT)

(*) Notice: Subject to any disclaimer, the term of this patent is extended or adjusted under 35 U.S.C. 154(b) by 0 days.

(21) Appl. No.: 17/428,799

(22) PCT Filed: Feb. 6, 2019

(86) PCT No.: PCT/EP2019/052849
§ 371 (c)(1),
(2) Date: Aug. 5, 2021

(87) PCT Pub. No.: WO2020/160762
PCT Pub. Date: Aug. 13, 2020

(65) Prior Publication Data
US 2022/0098445 A1 Mar. 31, 2022

(51) Int. Cl.
*C09G 3/00* (2006.01)
*C10M 169/04* (2006.01)
*C10M 173/02* (2006.01)
*C10N 50/00* (2006.01)

(52) U.S. Cl.
CPC .............. *C09G 3/00* (2013.01); *C10M 169/04* (2013.01); *C10M 173/02* (2013.01); *C10M 2219/104* (2013.01); *C10M 2229/025* (2013.01); *C10M 2229/0415* (2013.01); *C10N 2050/011* (2020.05)

(58) Field of Classification Search
CPC .............. C10M 107/50; C10M 135/36; C10M 169/04; C10M 2210/104; C10M 2229/0415; C10N 2050/011; C10N 2050/11; C09G 3/00
See application file for complete search history.

(56) References Cited

U.S. PATENT DOCUMENTS

| | | | |
|---|---|---|---|
| 3,770,633 A | 11/1973 | Holley et al. | |
| 4,828,885 A | 5/1989 | Rosenberg | |
| 2015/0000562 A1 | 1/2015 | Stepp et al. | |
| 2017/0073527 A1 | 3/2017 | Stepp et al. | |
| 2020/0317906 A1* | 10/2020 | Gernandt | C08F 2/38 |

FOREIGN PATENT DOCUMENTS

| | | | |
|---|---|---|---|
| CN | 104530971 | | 4/2015 |
| CN | 104530971 A | * | 4/2015 |
| DE | 20 2018 102 849 | | 5/2018 |
| EP | 0 527 286 | | 2/1993 |
| WO | 2013/120737 | | 8/2013 |

OTHER PUBLICATIONS

International Search Report (Form PCT/ISA/210) conducted in Int'l Appln. No. PCT/EP2019/052849 (dated Nov. 7, 2019).
International Written Opinion (Form PCT/ISA/237) conducted in Int'l Appln. No. PCT/EP2019/052849 (dated Nov. 7, 2019).
International Prelim. Exam. Report (Form PCT/IPEA/409) conducted in Int'l Appln. No. PCT/EP2019/052849 (dated Apr. 19, 2021).

* cited by examiner

*Primary Examiner* — James C Goloboy
(74) *Attorney, Agent, or Firm* — Greenblum & Bernstein, P.L.C.

(57) ABSTRACT

A lubricant for increasing the sliding capability of an item of sports equipment, in particular an item of winter sports equipment. The lubricant including an aqueous solution having an aqueous silicone emulsion, an emulsion of a polydimethylsiloxane, and a water-based formulation having methylisothiazolinone and/or benzoisothiazolinone.

16 Claims, No Drawings

GLIDE AGENT

FIELD OF THE INVENTION

The invention relates to a lubricant for increasing the sliding capability of an item of sports equipment, in particular an item of winter sports equipment.

In addition, the invention relates to a method for producing the lubricant according to the invention.

PRIOR ART

Lubricants for increasing the sliding capability of an item of sports equipment are known in particular from winter sports. To reduce the friction between a sliding surface of an item of winter sports equipment, for example, of skis, snowboards, or short skis, and to reduce a snow track, the sliding surface of the respective item of winter sports equipment is typically coated using a uniform thin layer made of ski wax (or wax).

For this purpose, it is generally necessary to fix the item of winter sports equipment in a device especially provided for this purpose, to heat the wax, and to apply it to the sliding surface, wherein the temperature of the wax has to be kept in a specific range. Subsequently, the wax has to be distributed as uniformly as possible over the sliding surface.

Alternatively, the ski wax can also be rubbed onto a sliding surface, which is accompanied by a lower material consumption, but also requires more precise work to produce the most uniform possible wax layer.

After sufficient cooling and hardening of the wax layer, which generally takes at least 30 minutes at room temperature, excess wax has to be removed. For this purpose, a scraper blade especially provided for this purpose has to be guided over the cooled wax until all excess wax has been removed.

After the application of the first wax layer (base layer), further layers made of fluorinated waxes usually follow, which have to be applied on the basis of the same work steps as the base layer to the sliding surface of the item of winter sports equipment.

Finally, the sliding surface has to be brushed multiple times using a brush and polished using a soft, for example fleece or cotton cloth.

The described waxing of the sliding surface is therefore very complex, because of which a corresponding treatment of the sliding surface usually has to be left to professionals. The waxing is typically the last work step of a comprehensive preparation of the item of winter sports equipment, during which edges of the sliding surface were previously also ground.

The described procedure is not only used in winter sports equipment, however. In summer competitions in ski jumping, in which ski jumps covered with mats are used, it is also necessary to appropriately optimize the sliding capability of the skis used in this case. This is because the jumping area of such mat ski jumps is covered with plastic mats, which are moistened and thus have similar sliding properties as snow.

The use of lubricants can also be advantageous in other fields of technology, for example in shipping, where the friction between the ship hull and the water or the surrounding air is to be reduced by applying wax to a ship hull surface.

OBJECT OF THE INVENTION

It is an object of the invention to overcome the disadvantages of the prior art and to propose a lubricant, the intended application of which can take place in a simpler and more time-saving manner than with known lubricants.

In particular, the intended application of the lubricant according to the invention is to manage without scraping and polishing the sliding surface.

Further objects which the invention is to achieve will be clear from the description.

DESCRIPTION OF THE INVENTION

One object of the invention is achieved by a lubricant according to the invention for increasing the sliding capability of an item of sports equipment, in particular an item of winter sports equipment, comprising
    an aqueous solution having
        an aqueous silicone emulsion,
        an emulsion of a polydimethylsiloxane, and having
        a water-based formulation having methylisothiazolinone and/or benzoisothiazolinone.

Due to the use of this aqueous solution in the lubricant according to the invention, it is possible to spray the lubricant onto a sliding surface of sports equipment, in particular winter sports equipment, for example onto running surfaces of skis, snowboards, snow blades, or bigfoot skis. The lubricant can thus be applied effortlessly in a uniform manner to the sliding surface of the sports equipment; subsequent brushing and polishing of the sliding surface can be omitted. The lubricant according to the invention is particularly well suitable for application by means of spraying due to the viscosity of the aqueous solution. The lubricant only requires a short action time, namely a few seconds, to provide the sliding surface treated with it with significantly improved sliding capability.

The aqueous silicone emulsion, which can be provided in extremely finely dispersed form having a particle size or droplet size in the nanometer range, can be diluted without problems using water or can be incorporated into aqueous formulations, which are preferably cold stirred. This silicone emulsion is used to impregnate the sliding surface and make it hydrophobic. The emulsion of a polydimethylsiloxane significantly improves the sliding properties of the sliding surface by its function as a sliding additive and flow additive, which appear in particular in water-based formulations. Finally, the presence of the water-based formulation having methylisothiazolinone (2-methyl-4-isothiazoline-3-one) and/or benzoisothiazolinone (1,2-benzothiazole-3-one) in the aqueous solution result in longer shelf life of the lubricant; this is achieved by the microbicidal and fungicidal effect of methylisothiazolinone and benzoisothiazolinone. Overall, a much higher level of sliding capability can surprisingly be achieved by the lubricant according to the invention than using known lubricants.

The lubricant according to the invention or the aqueous solution can also comprise glycols and/or cross-linking agents.

Due to the freezing point of the aqueous solution, which in a preferred embodiment of the lubricant according to the invention is $-5°$ C. or above, the lubricant is particularly well suitable for application in a workshop, since the temperatures prevailing there are always above this value.

In another preferred embodiment of the lubricant according to the invention, it is provided that the freezing point of the aqueous solution is in the range from $-1°$ C. to $0°$ C., preferably from $-0.5°$ C. to $0°$ C., particularly preferably $0°$ C. The ability to process the lubricant at temperatures, which will typically be significantly higher in a workshop, can be improved once again in this way, which is because of the optimum viscosity of the lubricant for processing at such temperatures.

In one preferred embodiment of the invention, it is provided that a mean particle size of the aqueous silicone emulsion is less than 100 nm, preferably less than 50 nm.

The averaging can be carried out in various ways, for example, on the basis of the median, the arithmetic mean, etc. The particle size or the diameter of the particles can be determined, for example, by means of dynamic light scattering (DLS).

Even more uniform coating of the sliding surface can thus be achieved, whereby the sliding properties can be further improved. In addition, the stability of the aqueous solution, in particular the silicone emulsion, can be further increased by this measure.

To increase the sliding capability still further, it is provided in another preferred embodiment of the invention that a mean particle size of the aqueous silicone emulsion is in the range from 15 nm to 35 nm, preferably from 20 nm to 30 nm, or particularly preferably 25 nm.

The required action time of the lubricant can thus surprisingly be reduced further.

In a further preferred embodiment of the lubricant according to the invention, it is provided that the polydimethylsiloxane is present in high-molecular-weight form in the polydimethylsiloxane emulsion.

A viscosity particularly favorable for the spraying is thus provided to the lubricant and the sliding surface treated using the lubricant according to the invention is surprisingly provided with extremely good sliding capability. Moreover, even more uniform coating of the sliding surface can be achieved.

So as not to endanger the health of the user during the intended application, it is provided in a further preferred embodiment that the lubricant is free of glycols.

One disadvantage of a sliding surface waxed as described at the beginning is that dirt particles can adhere easily to the wax layer; after a certain running distance, for example, a waxed ski can thus become slower than an unwaxed ski.

One preferred embodiment of the lubricant according to the invention avoids this disadvantage in that the lubricant of this embodiment is free of wax-based substances, preferably free of any petroleum products; due to the aqueous solution used according to the invention, however, the lubricant provides the sliding surface with improved sliding capability even without the use of wax-based substances or petroleum products.

Fluorocarbons are considered to be climate relevant and have very high greenhouse potentials due to their very long average dwell time in the atmosphere. Since the functionality of making the sliding surface hydrophobic is already provided to the lubricant according to the invention by the presence of the silicone emulsion, the lubricant according to the invention manages without any fluorocarbons.

It is accordingly provided in another preferred embodiment of the lubricant according to the invention that the lubricant is free of fluorocarbons.

A further preferred embodiment of the lubricant according to the invention is free of paraffin.

This is advantageous, since the presence of a not insignificant amount of paraffin in the lubricant would require a posttreatment of the sliding surface. In particular, the sliding surface would have to be scraped and polished, which can be omitted upon application of the lubricant according to the invention, however.

To make the production of the lubricant according to the invention as simple and cost-effective as possible, it is provided in a further preferred embodiment of the invention that at least 50 wt. %, preferably at least 85 wt. % of the aqueous solution consists of water.

A particularly hydrophobic sliding surface can be achieved by intended application of a preferred embodiment of the lubricant according to the invention, in which at least 5 wt. % of the aqueous solution consists of the aqueous silicone emulsion.

The sliding properties of a sliding surface treated using the lubricant according to the invention can be further optimized in that at least 1 wt. % of the aqueous solution consists of the emulsion of a polydimethylsiloxane, as is also the case in another preferred embodiment.

In a further preferred embodiment of the invention, it is provided that at least 0.1 wt. % of the aqueous solution consists of the water-based formulation having methylisothiazolinone and/or benzoisothiazolinone.

The durability of the coating of the sliding surface can thus be increased and it can be protected from soiling at the same time.

Optimum results—both with respect to increased sliding capability, and also with regard to a particularly simple application—are achieved with a further preferred embodiment of the lubricant according to the invention, in which embodiment between 84.8 wt. % and 88.8 wt. %, preferably between 85.8 wt. % and 87.8 wt. %, particularly preferably between 86.3 wt. % and 87.3 wt. %, in particular 86.8 wt. % of the aqueous solution consists of water, between 6 wt. % and 10 wt. %, preferably between 7 wt. % and 9 wt. %, particularly preferably between 7.5 wt. % and 8.5 wt. %, in particular 8 wt. % of the aqueous solution consists of the aqueous silicone emulsion, between 1 wt. % and 5 wt. %, preferably between 2 wt. % and 4 wt. %, particularly preferably between 2.5 wt. % and 3.5 wt. %, in particular 3 wt. % of the aqueous solution consists of the emulsion of a polydimethylsiloxane, and between 0.01 wt. % and 1 wt. %, preferably between 0.05 wt. % and 0.5 wt. %, particularly preferably between 0.1 wt. % and 0.3 wt. %, in particular 0.2 wt. % of the aqueous solution consists of the water-based formulation having methylisothiazolinone and/or benzoisothiazolinone.

An underlying stated object of the invention is also achieved by a method for producing the lubricant according to the invention, wherein the method comprises the following method steps:

Producing an aqueous solution by
a) providing water in a container,
b) adding an aqueous silicone emulsion,
c) adding an emulsion of a polydimethylsiloxane,
d) adding a water-based formulation having methylisothiazolinone and/or benzoisothiazolinone,
e) slowly stirring the aqueous solution for at least 30 minutes, preferably at least 50 minutes, particularly preferably approximately 1 hour.

Steps b), c), and d) can be carried out in any arbitrary sequence.

Ways of Embodying the Invention

The invention is explained in more detail hereinafter on the basis of exemplary embodiments. The lubricant of these exemplary embodiments can be sprayed onto running surfaces used as sliding surfaces of sports equipment of any type, thus, for example, on skis, snowboards, short skis, and the like.

However, the lubricant according to the invention can also be used in other fields of technology where it is necessary to minimize friction effects. This can be the case, for example, in shipping or air travel, where friction effects in particular can result in increased fuel consumption.

In a first exemplary embodiment, the lubricant for increasing the sliding capability of an item of sports equipment, in particular an item of winter sports equipment, comprises an aqueous solution, which aqueous solution in turn comprises an aqueous silicone emulsion, an emulsion of a polydimethylsiloxane, and a water-based formulation having methylisothiazolinone and benzoisothiazolinone.

In this case, between 86.3 wt. % and 87.3 wt. % of the aqueous solution consists of water, between 7.5 wt. % and 8.5 wt. % of the aqueous solution consists of the aqueous silicone emulsion, between 2.5 wt. % and 3.5 wt. % of the aqueous solution consists of the emulsion of a polydimethylsiloxane, and between 0.1 wt. % and 0.3 wt. % of the aqueous solution consists of the water-based formulation having methylisothiazolinone and benzoisothiazolinone.

In a second exemplary embodiment, 86.8 wt. % of the aqueous solution consists of water, 8 wt. % of the aqueous solution consists of the aqueous silicone emulsion, 3 wt. % of the aqueous solution consists of the emulsion of a polydimethylsiloxane, and 0.2 wt. % of the aqueous solution consists of the water-based formulation having methylisothiazolinone and benzoisothiazolinone.

Both in the case of the first exemplary embodiment and also in the case of the second exemplary embodiment, the product WACKER® HC 303 (Wacker Chemie AG) is used as the aqueous silicone emulsion, the product Tego® Glide 490 (Evonik Resource Efficiency GmbH) is used as the emulsion of a polydimethylsiloxane, and the product ACTICIDE® MBR1 (Thor GmbH) is used as the water-based formulation having methylisothiazolinone and benzoisothiazolinone.

WACKER® HC 303 is an extremely finely dispersed, aqueous silicone emulsion having particle sizes in the nanometer range, can be diluted using water without problems or incorporated into cold stirred aqueous formulations, and is outstandingly suitable for making greatly varying materials hydrophobic.

Tego® Glide 490 is an emulsion of a polydimethylsiloxane having high molecular weight. It acts as a lubricant and antiblocking agent, offers outstanding sliding and antiblocking properties in aqueous formulations, is free of tin and aromatic solvents, and can be diluted in water.

Methylisothiazolinone and/or benzoisothiazolinone is used only in a percentage between 0.01 wt. % and 1 wt. %, preferably approximately 0.2 wt. %, and has the function of not letting water break or become foul.

The lubricant of the first and the second exemplary embodiment can be produced on the basis of the following method:

First, 88.8 wt. % water is provided in a container. The water is stirred by means of a stirrer or manually.

In the further course, 8 wt. % Wacker® HC 303 is added to the water while stirring.

Subsequently, 3 wt. % Tego® Glide 490 is added while stirring and at slow speed.

Finally, 0.2 wt. % ACTICIDE® MBR1 is also added.

The aqueous solution thus resulting is then also stirred for approximately 60 minutes at low speed.

The invention claimed is:

1. A lubricant for increasing the sliding capability of an item of sports equipment, comprising a sprayable aqueous solution comprising:
   an aqueous silicone emulsion,
   an emulsion of a polydimethylsiloxane different from the aqueous silicone emulsion, and
   a water-based formulation having methylisothiazolinone and/or benzoisothiazolinone,
   wherein a mean particle size of the aqueous silicone emulsion is less than 100 nm, wherein the averaging of the particle size is performed by determining the arithmetic mean;
   wherein at least 50 wt. % of the aqueous solution consists of water.

2. The lubricant according to claim 1, wherein a mean particle size of the aqueous silicone emulsion is in a range of 15 nm to 35 nm.

3. The lubricant according to claim 1, wherein the freezing point of the aqueous solution is −5° C. or above.

4. The lubricant according to claim 2, wherein the freezing point of the aqueous solution is −5° C. or above.

5. The lubricant according to claim 1, wherein the lubricant is free of fluorocarbons.

6. The lubricant according to claim 1, wherein the lubricant is free of paraffin.

7. The lubricant according to claim 1, wherein at least 85 wt. % of the aqueous solution consists of water.

8. The lubricant according to claim 1, wherein the lubricant is free of glycols.

9. The lubricant according to claim 1, wherein the lubricant is free of wax-based substances.

10. The lubricant according to claim 1, wherein a mean particle size of the aqueous silicone emulsion is in a range of 20 nm to 30 nm.

11. The lubricant according to claim 1, wherein the freezing point of the aqueous solution is in the range of −1° C. to 0° C.

12. The lubricant according to claim 1, wherein the freezing point of the aqueous solution is in the range of −0.5° C. to 0° C.

13. The lubricant according to claim 2, wherein the freezing point of the aqueous solution is in the range of −1° C. to 0° C.

14. The lubricant according to claim 2, wherein the freezing point of the aqueous solution is in the range of −0.5° C. to 0° C.

15. The lubricant according to claim 1, wherein the lubricant is free any petroleum products.

16. The lubricant according to claim 1, wherein a mean particle size of the aqueous silicone emulsion is less than 50 nm.

* * * * *